United States Patent Office 3,280,589
Patented Oct. 25, 1966

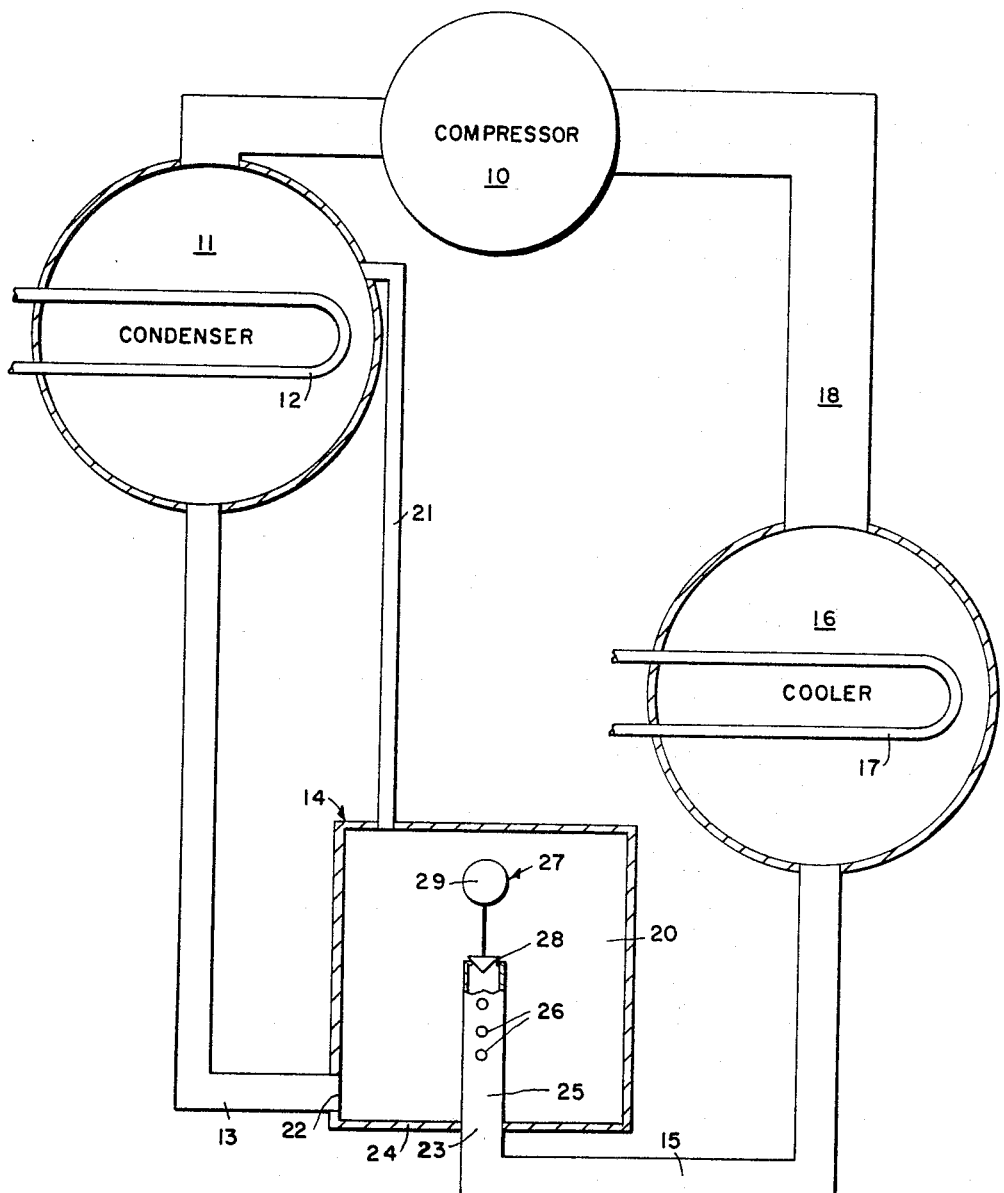

3,280,589
FLOW METERING DEVICE FOR
REFRIGERATION SYSTEM
James A. Papapanu, Syracuse, N.Y., assignor to Carrier Corporation, Syracuse, N.Y., a corporation of Delaware
Filed July 10, 1964, Ser. No. 381,709
3 Claims. (Cl. 62—218)

This invention relates to metering fluid flow and, more particularly, to a refrigerant flow metering device and to a method of metering refrigerant flow in a refrigeration circuit.

Various types of flow metering devices, usually in the form of a float valve assembly, are well known in the refrigeration field for regulating the flow of refrigerant to an evaporator or cooler. While the extensive use of refrigerant metering float valves is indicative of their general suitability for such use, they do have certain inherent shortcomings such as relatively movable parts which may wear and require replacement, and they may be blocked open by foreign material in the valve so as to improperly regulate the flow of refrigerant, or they may be held closed so that the only flow of refrigerant to the cooler is through a small orifice bypassing the valve or through the valve as permitted by a small, predetermined bleed setting of the valve is a closed position. A metering device with no relatively moving parts would therefore be desirable for overcoming the shortcomings of the popular refrigerant float valve. Such a metering device is provided by a standpipe having a vertically spaced series of orifices at least partially submerged in liquid refrigerant for regulating the flow of refrigerant to the cooler as determined by the number of the orifices submerged in the liquid refrigerant and the pressure difference across the standpipe. Within limits, such a metering device is adequate for metering refrigerant to the cooler. However, at full cooling capacity design conditions the orifices are entirely submerged in liquid refrigerant so that gas is effectively prevented from passing to the cooler and the pressure difference across the orifices is the only factor regulating the flow of refrigerant liquid. Various conditions may cause the refrigeration system to operate at other than design conditions. For example, the condensing water normal design temperature (for example, 85° F.) may drop (for example to 70° F.), so that the cooling capacity of the system can be increased above its normal design capacity (for example, 40 tons) to a substantially higher capacity (for example, 50 tons). However, in order to provide efficient operation at full design cooling capacity, the orifices should be fully submerged so that only liquid refrigerant is passed to the cooler, and therefore the expected increase in cooling capacity based on a lower condensing water temperature could not be obtained because the series of orifices could not pass the required additional refrigerant.

It is a primary object of this invention to provide a new and improved flow metering device.

Another object is provision of a new and improved flow metering device for a refrigeration circuit. A related object is provision of such a device combining a standpipe having a series of orifices for metering the flow of refrigerant during normal partial load cooling operation, and a float valve assembly cooperating with the series of orifices for metering refrigerant during full load cooling operation.

These and other objects of the invention will be apparent from the following description and the drawing which is a schematic flow diagram of a refrigeration circuit incorporating the subject flow metering device.

Referring to the drawing, the invention may utilize any suitable refrigerant, for example, octafluorocyclobutane, commonly referred to as C318 and having a chemical formula $C_4F_8$. A refrigerant compressor 10 passes compressed refrigerant vapor to a refrigerant condenser 11 in which the vapor is condensed and cooled by means of a suitable condensing tube bundle 12. From the refrigerant condenser 11 the condensate passes through a condensate inlet line 13 to a refrigerant flow metering device 14 from which the metered refrigerant passes through a refrigerant outlet line 15 to an evaporator or cooler 16. The cooler includes suitable means, such as a chilled water bundle 17, for vaporizing the liquid refrigerant to cool chilled water which is passed through the bundle and a chilled water line to a load to be cooled. Refrigerant vapor in the cooler in withdrawn through a suction line 18 by means of the compressor 10 which again compresses the vapor thus completing a basic refrigeration circuit.

The refrigerant flow metering device 14 includes a closed refrigerant chamber 20 for containing liquid refrigerant in a lower portion and refrigerant vapor in an upper portion. In keeping with usual practice, the upper portion of the chamber is preferably vented to the refrigerant condenser 11 as by a vent line 21. The inlet line 13 is suitably connected with an inlet 22, herein in a lower portion of the chamber 20, for the passage of liquid refrigerant into the chamber. An outlet 23, herein in a bottom wall 24 of the chamber 20, is suitably connected with the refrigerant outlet line 15 to the cooler for the passage of refrigerant from the chamber to the cooler. A conduit, here in the form of a standpipe 25, has its lower end suitably connected with the outlet 23 and has a series of vertically spaced ports or orifices 26 for metering substantially the entire flow of refrigerant from the chamber 20 through the outlet 23 during partial load operation. As illustrated, the series of orifices 26 is preferably above the top of the inlet 22. During partial load operation, the level of liquid refrigerant in the chamber 20 is normally relatively low so that only a portion of these orifices is submerged in the liquid. The number of orifices submerged and the pressure difference between the high pressure side of the circuit including the inlet 22 and a low pressure side of the system including the outlet 23, determines the flow rate of refrigerant to the cooler 16. As the refrigerant circuit approaches design full load cooling capacity, the series of orifices 26 will be entirely submerged in liquid refrigerant so that the flow rate of refrigerant to the cooler 16 is regulated solely by the pressure difference between the inlet 22 and the outlet 23. At design full load cooling capacity the liquid level in the chamber 20 is high enough that a modulating float valve assembly 27 will open, and in cooperation with the series of orifices 26, meter the flow of refrigerant to the cooler 16. It should be noted that at constant entering condensing water temperature at the refrigerant condenser 11, as the cooling capacity increases the liquid level in the chamber 20 rises and at constant cooling capacity an increase in condensing water temperature results in a lower liquid level in the chamber 20.

The float valve assembly 27 includes a modulating valve 28 communicating with the outlet 23, and more particularly, positioned in the top end of the standpipe 25 above the series of orifices 26. A float 29 of the assembly is positioned in the chamber 20 for opening the valve 28 only responsive to a level of liquid refrigerant in the chamber above the valve 28 and the series of ports 26. As the level of liquid refrigerant in the chamber 20 above the valve 28 varies, the float 29 is operative to modulate the amount of opening of the valve 28 to regulate the flow of refrigerant through the outlet 23. The ratio of total open area of the series of ports 26 and the valve 28 when it is fully opened depends on design conditions, but in one application it was found desirable to have these areas about equal. Therefore, when the valve 28 is opened any amount the float valve assembly 27 controls the metering of refrigerant through the flow metering device responsive to the level of refrigerant within the chamber 20, and an artificial load on the cooler is effectively prevented since refrigant gas is effectively prevented from passing from the flow metering device to the cooler because the orifices 26 and valve 28 are submerged in liquid refrigerant.

It should be noted that since the float valve 28 handles less than all the maximum flow of refrigerant at full cooling capacity, for example only 50%, the float 29 may be relatively large compared with the valve 28 while still within a reasonable size for practical installation, thus reducing the possibility of the valve 28 sticking and providing more positive valve action.

While a preferred embodiment of the invention has been described and illustrated, it will be understood that the invention is not limited thereto since it may be otherwise embodied within the scope of the following claims.

I claim:
1. A refrigerant flow metering device for a regrigeration circuit, comprising, means including a chamber for containing liquid refrigerant, means defining an inlet for the passage of liquid refrigerant into said chamber, outlet means including means defining an outlet for the passage of liquid refrigerant from said chamber, a standpipe in said chamber and connected with said outlet, and means defining a vertically spaced series of orifices in said standpipe for at least partial submersion in liquid refrigerant in said chamber and for metering substantially the entire flow of refrigerant from said chamber through said outlet during partial load cooling operation, and means including a normally closed valve opening into said outlet for submersion in liquid refrigerant in said chamber and the passage of liquid refrigerant from the chamber through said outlet when the valve is open, and means for opening said valve responsive to a level of liquid refrigerant in said chamber above said valve and said series of orifices as during high cooling capacity operation, whereby at high cooling capacity, the valve and series of orifices are submerged in liquid refrigerant and the valve is open to pass liquid refrigerant as required to satisfy the cooling demand while effectively preventing the passage of gas through the outlet.

2. A refrigerant flow metering device for a refrigeration circuit comprising means including a chamber for containing liquid refrigerant, means defining an inlet for the passage of liquid refrigerant into said chamber, outlet means including means defining an outlet for the passage of liquid refrigerant from said chamber, a conduit in said chamber connected with said outlet, and means defining a vertically spaced series of orifices in said conduit for at least partial submersion in liquid refrigerant in said chamber and for metering substantially the entire flow of refrigerant from said chamber through said outlet during partial load cooling operation, and float valve assembly means including a normally closed modulating valve opening into said conduit and positioned for submersion in liquid refrigerant and the passage of liquid refrigerant from the chamber through said outlet when the valve is open, and a float above said valve and at the top of said series of orifices for opening said valve when the level of liquid refrigerant in said chamber is above said valve and said series of orifices as during high cooling capacity operation whereby, at high cooling capacity, the valve and series of orifices are submerged in liquid refrigerant and the valve is open to pass liquid refrigerant as required to satisfy the cooling demand while effectively preventing the passage of gas through the outlet, the total area of said series of orifices about equaling the area of said valve when fully open.

3. The device of claim 2 wherein said valve is at the top of said conduit and above said series of orifices.

References Cited by the Examiner
UNITED STATES PATENTS
1,830,022   11/1931   Fourness _____ 62—218
FOREIGN PATENTS
252,647   5/1926   Great Britain.

MEYER PERLIN, *Primary Examiner.*